United States Patent
Jamison et al.

(10) Patent No.: US 11,479,709 B2
(45) Date of Patent: Oct. 25, 2022

(54) COMPRESSED LOST CIRCULATION MATERIALS

(71) Applicant: Halliburton Energy Services, Inc., Houston, TX (US)

(72) Inventors: Dale E. Jamison, Humble, TX (US); Xiangnan Ye, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 130 days.

(21) Appl. No.: 16/492,321

(22) PCT Filed: Oct. 16, 2018

(86) PCT No.: PCT/US2018/055978
§ 371 (c)(1),
(2) Date: Sep. 9, 2019

(87) PCT Pub. No.: WO2020/081053
PCT Pub. Date: Apr. 23, 2020

(65) Prior Publication Data
US 2021/0108123 A1     Apr. 15, 2021

(51) Int. Cl.
*C09K 8/518*     (2006.01)
*E21B 21/00*     (2006.01)
*C09K 8/502*     (2006.01)

(52) U.S. Cl.
CPC ............. *C09K 8/518* (2013.01); *C09K 8/502* (2013.01); *E21B 21/003* (2013.01)

(58) Field of Classification Search
CPC .......... C09K 8/516; C09K 8/518; C09K 8/50; C09K 8/502; C09K 8/503; C09K 8/487;
(Continued)

(56) References Cited

U.S. PATENT DOCUMENTS 2,634,098 A * 4/1953 Armentrout ........... C09K 8/516
    175/72
2,778,604 A * 1/1957 Reistle, Jr. ............ E21B 21/003
    166/292

(Continued)

FOREIGN PATENT DOCUMENTS

WO   WO-2004018841 A1 *  3/2004  ............... C09K 8/50
WO       2010/034379 A1    4/2010

OTHER PUBLICATIONS

International Search Report and Written Opinion issued in related PCT Application No. PCT/US2018/055978 dated Jul. 15, 2019, 12 pages.

*Primary Examiner* — Angela M DiTrani Leff
(74) *Attorney, Agent, or Firm* — Conley Rose, P.C.; Rodney B. Carroll

(57) ABSTRACT

Compressed lost circulation materials for use in subterranean formations are provided. In some embodiments, the methods include: introducing a treatment fluid that includes a base fluid and a compressed lost circulation material into a wellbore penetrating at least a portion of a subterranean formation including a loss zone, the compressed lost circulation material including a binding material and a compressed material; allowing the binding material to at least partially degrade or dissolve; and allowing the compressed lost circulation material to at least partially expand in the subterranean formation.

20 Claims, 3 Drawing Sheets

(58) Field of Classification Search
CPC .............. C09K 8/467; C09K 2208/18; C09K 2208/04; C09K 2208/08; C09K 2208/10; E21B 21/00; E21B 21/003; E21B 33/00; E21B 2200/01
See application file for complete search history.

(56) References Cited

U.S. PATENT DOCUMENTS

| | | | | |
|---|---|---|---|---|
| 2,836,555 | A * | 5/1958 | Armentrout | C09K 8/516 507/112 |
| 3,870,668 | A * | 3/1975 | Fischer | C08K 5/10 507/116 |
| 4,428,844 | A * | 1/1984 | Wagener | C09K 8/06 162/100 |
| 4,614,599 | A * | 9/1986 | Walker | C09K 8/03 175/72 |
| 4,664,816 | A * | 5/1987 | Walker | C09K 8/24 175/72 |
| 5,476,543 | A * | 12/1995 | Ryan | C09K 8/516 106/218 |
| 6,581,701 | B2 | 6/2003 | Heying | |
| 8,381,813 | B2 * | 2/2013 | Diaz | C09K 8/518 166/286 |
| 8,946,133 | B2 | 2/2015 | Lee et al. | |
| 9,080,094 | B2 | 7/2015 | Nguyen et al. | |
| 2003/0104949 | A1 * | 6/2003 | Myers | C09K 8/46 507/100 |
| 2009/0264321 | A1 * | 10/2009 | Showalter | C09K 8/512 507/219 |
| 2010/0004146 | A1 | 1/2010 | Panga et al. | |
| 2011/0048720 | A1 * | 3/2011 | Diaz | C09K 8/518 166/309 |
| 2012/0067587 | A1 * | 3/2012 | Agrawal | C08J 9/36 166/309 |
| 2012/0325559 | A1 * | 12/2012 | Hedges | E21B 49/02 175/58 |
| 2015/0315886 | A1 * | 11/2015 | Potapenko | C04B 20/0096 166/305.1 |
| 2016/0137912 | A1 * | 5/2016 | Sherman | C09K 8/706 166/243 |
| 2016/0340569 | A1 * | 11/2016 | Belcher | C09K 8/584 |
| 2017/0088431 | A1 * | 3/2017 | Shahsavari | B05D 1/30 |
| 2017/0275965 | A1 * | 9/2017 | Watson | E21B 43/26 |
| 2018/0305998 | A1 * | 10/2018 | Wang | E21B 33/138 |

* cited by examiner

_US 11,479,709 B2_

COMPRESSED LOST CIRCULATION MATERIALS

CROSS-REFERENCE TO RELATED APPLICATION

The present application is a U.S. National Stage Application of International Application No. PCT/US2018/055978 filed Oct. 16, 2018, which is incorporated herein by reference in its entirety for all purposes.

BACKGROUND

The present disclosure relates to methods and compositions for using compressed lost circulation materials in subterranean formations.

Treatment fluids are used in a variety of operations that may be performed in subterranean formations. As referred to herein, the term "treatment fluid" will be understood to mean any fluid that may be used in a subterranean application in conjunction with a desired function and/or for a desired purpose. The term "treatment fluid" does not imply any particular action by the fluid. Treatment fluids often are used in, e.g., well drilling, completion, and stimulation operations. Examples of such treatment fluids include, inter alia, drilling fluids, well cleanup fluids, workover fluids, conformance fluids, gravel pack fluids, acidizing fluids, fracturing fluids, spacer fluids, and the like.

While drilling a wellbore penetrating a subterranean formation, the drilling fluid being circulated through the wellbore may be lost into the surrounding formation. Fluids are typically lost into the formation through fractures induced by excessive mud pressures, pre-existing open fractures, or large openings with structural strength in the formation. In addition to underground blowouts, cross flow, and loss of hydrostatic pressure, lost circulation can lead to a drill pipe becoming lodged in the wellbore. In some instances, drilling may be terminated to allow for a remedial operation to be performed.

In some drilling operations when lost circulation is observed, the wellbore may be treated with lost circulation materials ("LCM") for plugging the portion of formation through which the fluids are being lost. A variety of LCMs have been used or proposed for arresting lost circulation of drilling fluids. However, in some instances, the lost circulation may be so severe that traditional lost circulation materials are not effective at arresting lost circulation. For example, in some cases, traditional lost circulation materials may not be sufficiently large to reduce or prevent lost circulation.

BRIEF DESCRIPTION OF THE DRAWINGS

These drawings illustrate certain aspects of some of the embodiments of the present disclosure and should not be used to limit or define the claims.

Figure 1:
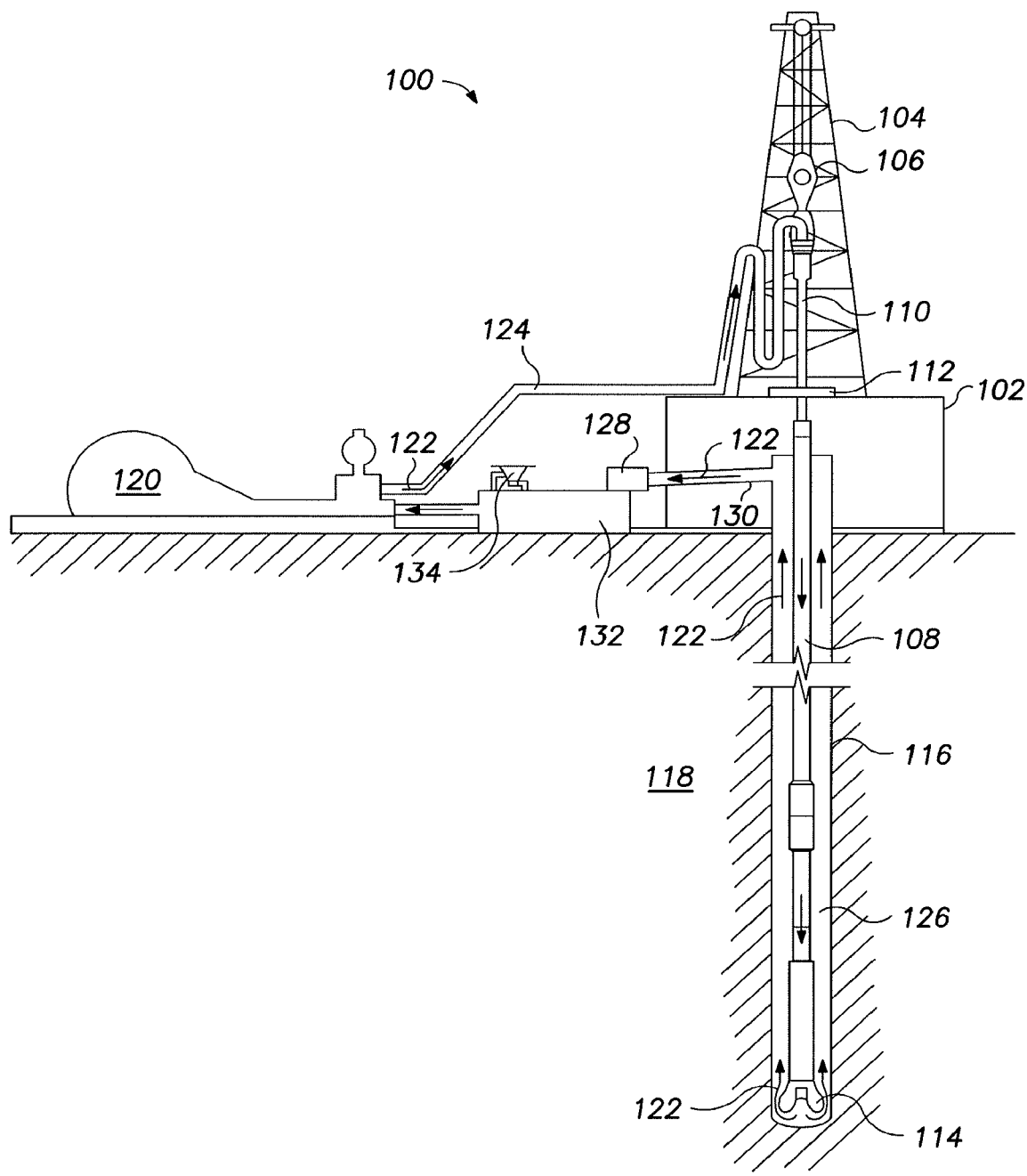
FIG. 1 is a schematic diagram of a system that may deliver lost circulation materials of the present disclosure to a downhole location in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to methods and compositions for use in subterranean formations, and specifically, to compressed lost circulation materials and methods for use.

More specifically, the present disclosure provides methods including: introducing a treatment fluid that includes a base fluid and a compressed lost circulation material into a wellbore penetrating at least a portion of a subterranean formation including a loss zone, the compressed lost circulation material including a binding material and a compressed material; allowing the binding material to at least partially degrade or dissolve; and allowing the compressed lost circulation material to at least partially expand in the subterranean formation. In certain embodiments, the present disclosure provides compositions including a base fluid and a plurality of expandable compressed lost circulation material particles having a substantially uniform particle size distribution, wherein the plurality of expandable compressed lost circulation material particles have a multi-modal particle size distribution when at least partially expanded. As used herein, "loss zone" refers to a portion of a subterranean formation into which fluids circulating in a wellbore may be lost. In certain embodiments, loss zones may include voids, vugular zones, wash-outs, lost circulation zones, perforations, natural fractures, induced fractures, and any combination thereof.

In certain embodiments, the present disclosure provides a method including forming a compressed lost circulation material by combining a binding material with a compressed material; introducing a treatment fluid including a base fluid and the compressed lost circulation material into a wellbore penetrating at least a portion of a subterranean formation including a loss zone; and allowing the compressed lost circulation material to at least partially expand in the subterranean formation.

Among the many potential advantages to the methods and compositions of the present disclosure, only some of which are alluded to herein, the methods and compositions of the present disclosure may provide improved lost circulation materials for use in subterranean formations. For example, in certain embodiments, the methods and compositions of the present disclosure may provide larger lost circulation materials for use in loss zones without significantly increasing the size of the material that is pumped. In certain embodiments, the larger lost circulation materials of the present disclosure may increase loss zone plugging efficiency without requiring additional pumping power. Additionally, a compressed lost circulation material of the present disclosure may be easier to transport to the wellsite due to its smaller size as compared to certain conventional materials.

In some embodiments, the lost circulation material may be brittle or hard when compressed, allowing the material to be processed into different particle sizes. In certain embodiments, the particle sizes of the compressed lost circulation material may be tuned for a particular application. For example, lost circulation materials may be ground to a uniform or substantially uniform particle size distribution, among other reasons, to simplify transport and pumping downhole. In some embodiments, the lost circulation materials of the present disclosure may be designed to have a uniform or substantially uniform particle size distribution when compressed and a multi-modal size distribution when expanded. In certain embodiments, the density of the compressed lost circulation material also may be tunable, e.g., by adjusting the amount of binding material present in the compressed lost circulation material.

In certain embodiments, the lost circulation material of the present disclosure may include a compressed material. As used herein, "compressed material" refers to a material that is in a compressed state. In some embodiments, the compressed material may be expandable. Examples of compressed materials suitable for certain embodiments of the present disclosure include, but are not limited to a foam, a spring, an expandable polymer, a fiber (e.g., an organic fiber or an inorganic fiber), a silk, a wire screen, a glass, cotton, bamboo, jute, hemp, natural hair, a nut-husk material, carbon, nylon, polyethylene, polypropylene, an aramid, a ceramic, a rubber, cellulose, a cellulosic sponge, a polyester, rayon, bio-cellulose, and any combination thereof. In some embodiments, the foam may be a reticulated foam. In certain embodiments, the compressed material could be a 3-D printed material. In some embodiments, the compressed material may include a degradable polymer. Examples of degradable polymers that may be suitable for certain embodiments of the present disclosure include, but are not limited to poly(lactic acid); polyhydroxyalkanoate, polyglycolic acid, polyol, poly(ortho ester); polybutylene succinate; polybutylene succinate-co-adipate; polyhydroxybutyrate-valerate; polyhydroxybutyrate-covalerate; polycaprolactones; polyester amide; a starch-based polymer; polyvinyl alcohol; an aliphatic aromatic copolyester; and any combination thereof.

Springs suitable as compressed materials for certain embodiments of the present disclosure may be any suitable shape, including, but not limited to tapered, hourglass, barrel, ball, and any combination thereof. In some embodiments, a spring may include hooks or other features that promote entanglement. In some embodiments, the treatment fluids of the present disclosure may include a first compressed lost circulation material and a second compressed lost circulation material. For example, in certain embodiments, a first compressed lost circulation material may include a first compressed material and a second compressed lost circulation material may include a second compressed material that is different from the first compressed material.

In certain embodiments, the compressed lost circulation material may include a binding material. In certain embodiments, the binding material may include at least one of a salt and an adhesive. In certain embodiments, the binding material may retain or lock the lost circulation material in a compressed state. In some embodiments, the compressed material in the compressed lost circulation material may be compressed to from about 1% to about 95%, from about 25% to about 75%, or from about 25% to about 50% of the uncompressed volume of the compressed material. In certain embodiments, the binding material may retain the compressed lost circulation material in a compressed state until the binding material at least partially dissolves or degrades.

In some embodiments, the binding material may degrade or dissolve in response to a wellbore condition. For example, the binding material may dissolve or degrade in response to at least one of temperature, pressure, pH, salinity, solvency, or the presence of enzymes. In certain embodiments, the binding material may degrade or dissolve in response to exposure to an aqueous or non-aqueous fluid. For example, in certain embodiments, a non-aqueous treatment fluid including a compressed lost circulation material including a water-soluble binding material may be introduced into the wellbore followed by an aqueous fluid (e.g., an aqueous pill), which may be allowed to contact the compressed lost circulation material, triggering the binding material to dissolve or degrade. In another example, a compressed lost circulation material including an oil-soluble binding material may be introduced into the wellbore in an aqueous fluid and an oil-based fluid (e.g., an oil-based pill) may be introduced into the wellbore and allowed to contact the compressed lost circulation material, triggering the oil-soluble binding material to dissolve or degrade. In an embodiment, the binding material may include a degradable polymer which degrades due to a chemical and/or radical process such as hydrolysis or oxidation. A person of skill in the art with the benefit of this disclosure would understand that the degradability of a polymer may depend at least in part on its backbone structure. In some embodiments, the rates at which such polymers degrade may be at least partially dependent upon polymer characteristics such as the type of repetitive unit, composition, sequence, length, molecular geometry, molecular weight, morphology (e.g., crystallinity, size of spherulites, and orientation), hydrophilicity, hydrophobicity, surface area, and type of additives. Additionally, the ambient downhole environment to which a given polymer is subjected (e.g., temperature, presence of moisture, oxygen, microorganisms, enzymes, pH, pressure, the like, and combinations thereof) may also influence how it degrades.

In certain embodiments, the binding material may include a carbonate and the binding material may be degraded by exposure to an acidic fluid. In some embodiments, the binding material may include a plastic and the binding material may be degraded by exposure to a basic fluid. In some embodiments, the binding material may include a thermally degrading polymer and the binding material may hydrolyze above certain temperatures (e.g., above about 200° F.).

In some embodiments, the compressed lost circulation material is formed by depositing a binding material (e.g., a salt) onto a compressed material. In some embodiments, the salt may be precipitated or crystallized onto the compressed material. In certain embodiments, a lost circulation material may be formed by mixing one or more solutions with a compressed material and then drying the solution to yield a compressed lost circulation material that is locked in the compressed state by the crystallized salt. In some embodiments, the steps of combining the compressed material with the solution and drying may be repeated two or more times to yield a compressed lost circulation material. Examples of salts suitable for certain embodiments of the present disclosure include, but are not limited to a carbonate, a halide salt, and any combination thereof. In certain embodiments, the salt may include calcium carbonate. In some embodiments, the salt may include sodium chloride or calcium chloride. In some embodiments, the salt may be present in the compressed lost circulation material in an amount from about 1% to about 35% by weight of the compressed lost circulation material, from about 1% to about 25% by weight of the compressed lost circulation material, from about 1% to about 10% by weight of the compressed lost circulation material, or from about 10% to about 35% by weight of the compressed lost circulation material.

In some embodiments, the compressed lost circulation material may be formed by combining a compressed material with an adhesive (e.g., as a binding material). For example, the compressed lost circulation material may be formed by coating the compressed material with an adhesive. A person of skill in the art with the benefit of this disclosure would understand which adhesives are suitable for embodiments of the present disclosure. In certain embodiments, the adhesive may be water soluble. For example, in certain embodiments, the adhesive may dissolve or degrade over time when submerged in an aqueous fluid. In certain embodiments the adhesive may be thermally active. For example, the adhesive may degrade in response to exposure to temperatures of about 200° F. or higher, about 250° F. or higher, or about 300° F. or higher. In certain embodiments, the rate at which the adhesive degrades or dissolves may depend, at least in part, on the amount or type of adhesive present in the compressed lost circulation material.

In certain embodiments, the adhesive is a water-soluble synthetic or naturally-occurring polymer. Examples of adhesives suitable for certain embodiments of the present disclosure include, but are not limited to guar, hydroxypropyl guar, hydroxyethyl cellulose, carboxylmethylhydroxyethyl cellulose, xanthan gum, a polyacrylamide, a polyvinyl alcohol, a cyanoacrylate, a thermoplastic polyurethane, and any combination thereof. In some embodiments, the adhesive may be present in the compressed lost circulation material in an amount from about 0.5 to about 50% by weight, from about 0.5 to about 25% by weight, or from about 5 to about 25% by weight. In certain embodiments, the compressed lost circulation material may include both a salt and an adhesive.

In certain embodiments, the lost circulation materials of the present disclosure may exhibit a substantially uniform particle size distribution or a multi-modal particle size distribution at different points in time and/or during their use. As used herein, lost circulation materials having a "substantially uniform particle size distribution" are materials in which the standard deviation of the particle sizes in a representative sample of the particles is within about 30% of the mean (number) particle size. As used herein, lost circulation materials having a "multi-modal particle size distribution" are materials in which a significant number of particles are of a size an order of magnitude removed from the mean particle size. In certain embodiments, lost circulation materials may include a bimodal or trimodal particle size distribution. In some embodiments, a lost circulation material may exhibit a uniform particle size distribution when compressed and a multi-modal size distribution when at least partially expanded. For example, in certain embodiments, a plurality of expandable compressed lost circulation material particles may have a uniform or substantially particle size distribution when compressed and a multimodal particle size distribution when partially or fully expanded. In some embodiments, a plurality of compressed materials may be combined with one or more binding materials and then processed (e.g., ground) into particles of a uniform particle size distribution. In some embodiments, the compressed lost circulation materials may be processed by mechanically sizing, cutting or, chopping the compressed lost circulation materials into particles using any suitable methodologies for such processes. When the binding material at least partially degrades or dissolves, the plurality of compressed lost circulation materials may expand to particles of different sizes, resulting in a plurality of lost circulation materials with a multi-modal particle size distribution. In some embodiments, the plurality of lost circulation material particles may include two or more different compressed materials. The compressed lost circulation materials suitable for use in this disclosure may include particles of any suitable geometry, including, but not limited to beads, hollow beads, spheres, ovals, fibers, rods, pellets, platelets, disks, plates, ribbons, and the like, or combinations thereof.

In some embodiments, the expanded lost circulation material (e.g., the lost circulation material that has expanded after the binding material has at least partially dissolved or degraded) may exhibit a multimodal particle size distribution. For example, from about 20% to about 25% of the expanded lost circulation material may have a particle size distribution ranging from about 4 to about 10 U.S. mesh, greater than about 50% of the expanded lost circulation material may have a particle size distribution ranging from about 20 to about 40 U.S. mesh, and the remaining expanded lost circulation material may have a particle size distribution of equal to or less than about 40 U.S. mesh.

In certain embodiments, the lost circulation materials of the present disclosure (in a compressed or expanded state) may include particles having an average particle diameter ranging from about 0.1 mm to about 30 mm, from about 0.5 mm to about 7 mm, or from about 1 mm to about 7 mm. In certain embodiments, the lost circulation material may be at least 0.1 mm in diameter or at least 1 mm in size. In some embodiments, the diameter of the lost circulation material may be 30 mm or less, 14 mm or less, or 7 mm or less.

In one or more embodiments, the lost circulation material (in a compressed or expanded state) may include particles sized within a range of from about 4 U.S. mesh to about 40 U.S. mesh. In some embodiments, the lost circulation material includes particles sized 4 U.S. mesh or smaller. In certain embodiments, the lost circulation material includes particles sized 50 U.S. mesh or larger. In certain embodiments, at least 95% of the lost circulation material particles may be sized 4 U.S. mesh or smaller. In certain embodiments, at least 50% of the lost circulation material may be sized 20 U.S. mesh or smaller. In certain embodiments, at least 5% of the lost circulation material particles may be sized 40 U.S. mesh or smaller. For example, in some embodiments, the lost circulation material may have a d50 particle size distribution of from about 20 to about 40 U.S. mesh. In certain embodiments, the lost circulation material may exhibit a d50 particle size distribution of 4 U.S. mesh or smaller, 20 U.S. mesh or smaller, or 40 U.S. mesh or smaller. As used herein, references to particle sizes of a particular mesh "or larger" and grammatical equivalents thereof refers to particles of that particular mesh size and particles larger than that size. Similarly, as used herein, references to sizes of a particular mesh "or smaller" and grammatical equivalents thereof refers to particles of that particular mesh size and particles smaller than that size.

In certain embodiments, the compressed lost circulation material may exhibit a particle size distribution of around 40 mesh or smaller when pumped into the wellbore and expand to a particle size distribution of 4 U.S. mesh or smaller after the lost circulation material at least partially expands in the wellbore.

In certain embodiments, the uncompressed porosity of a lost circulation material or compressed material suitable for use in this disclosure may range from about 20 volume percent (vol. %) to about 90 vol. %, alternatively from about 30 vol. % to about 70 vol. %, or alternatively from about 40 vol. % to about 50 vol. %. As used herein, the uncompressed porosity of a material refers to the percentage of volume that the pores (i.e., voids, empty spaces) occupy based on the total volume of the material when the material is in an uncompressed state. In some embodiments, the pore size of an uncompressed lost circulation material suitable for use in this disclosure may range from about 50 microns to about 2,000 microns, alternatively from about 100 microns to about 1,000 microns, or alternatively from about 200 microns to about 500 microns. In certain embodiments, the compressive strength of a lost circulation material suitable for use in this disclosure in an uncompressed state may range from about 0.5 psi to about 50 psi, alternatively from about 1 psi to about 20 psi, or alternatively from about 2 psi to about 10 psi.

In some embodiments, lost circulation materials in an uncompressed state may have a bulk density of from about 0.05 g/cc to about 1 g/cc, alternatively from about 0.1 g/cc to about 0.5 g/cc, or alternatively from about 0.1 g/cc to about 0.2 g/cc. In some embodiments, lost circulation materials in a compressed state may have a bulk density of from about 1 to about 10 g/cc, 2.6 to about 10 g/cc, or 2 to about 20 glee. For example, in certain embodiments, a wire spring may have a bulk density of about 2.6 to 10 g/cc when compressed, but have a much lower bulk density (e.g., around 0.1 g/cc to 0.5 g/cc) when expanded.

In some embodiments, the volume of a treatment fluid including a compressed lost circulation material that is introduced into a wellbore may depend, at least in part, on the bulk density of the compressed lost circulation material. For example, the volume of a lost circulation fluid pill including a treatment fluid including a compressed lost circulation material may depend, at least in part, on wellbore pressure and the bulk density of the compressed lost circulation material.

In some embodiments, the lost circulation material may be present in the treatment fluids in an amount of from about 1% to about 65% by weight of the treatment fluid (e.g., about 1%, about 5%, about 10%, about 15%, about 20%, about 25%, about 30%, about 35%, about 40%, about 45%, about 50%, about 55%, about 60%, about 65%, etc.). In some embodiments, the lost circulation material may be present in the treatment fluids in an amount of from about 5% to about 60% by weight of the treatment fluid. In some embodiments, the lost circulation material may be present in an amount of from about 20% to about 35% by weight of the treatment fluid.

In some embodiments, the treatment fluids of the present disclosure optionally may include a weighting agent. Examples of suitable weighting agents include, but are not limited to barite, hematite, calcium carbonate, magnesium carbonate, iron carbonate, zinc carbonate, manganese tetraoxide, ilmenite, NaCl, KCl, $CaCl_2$, formate salts, and any combination thereof. These weighting agents may be at least partially soluble or insoluble in the treatment fluid. In some embodiments, a weighting agent may be present in the treatment fluids in an amount of from about 1% to about 60% by weight of the treatment fluid (e.g., about 5%, about 10%, about 15%, about 20%, about 25%, about 30%, about 35%, about 40%, about 45%, about 50%, about 55%, etc.). In some embodiments, the weighting agents may be present in the treatment fluids in an amount of from about 1% to about 35% by weight of the treatment fluid. In some embodiments, the weighting agent may be present in the treatment fluids in an amount of from about 1% to about 10% by weight of the treatment fluid. Alternatively, the amount of weighting agent may be expressed by weight of dry solids. For example, the weighting agent may be present in an amount of from about 1% to about 99% by weight of dry solids (e.g., about 1%, about 5%, about 10%, about 20%, about 30%, about 40%, about 50%, about 60%, about 70%, about 80%, about 90%, about 99%, etc.). In some embodiments, the weighting agent may be present in an amount of from about 1% to about 20% and, alternatively, from about 1% to about 10% by weight of dry solids.

Certain components of the treatment fluid may be provided as a "dry mix" to be combined with a base fluid and/or other components prior to or during introducing the treatment fluid into the subterranean formation. In some embodiments, dry mix compositions may be designed to include a base fluid in an amount from about 1 to about 20 gallons per 94-lb sack of dry blend (gal/sk). In certain embodiments, dry mix compositions may be suitable for base fluids in the amount of 10 gal/sk. In some embodiments, dry mix compositions may be suitable for base fluids in the amount of 13.5 gal/sk. Embodiments of the treatment fluids of the present invention may be prepared in accordance with any suitable technique. In some embodiments, the desired quantity of water may be introduced into a mixer followed by the dry blend. The dry blend may include the lost circulation material and additional solid additives, for example. Additional liquid additives, if any, may be added to the base fluid as desired prior to, or after, combination with the dry blend. This mixture may be agitated for a sufficient period of time to form a slurry. It will be appreciated by those of ordinary skill in the art, with the benefit of this disclosure, other suitable techniques for preparing treatment fluids may be used in accordance with embodiments of the present invention.

In certain embodiments, the treatment fluids of the present disclosure may include additional lost circulation materials or bridging agents. In certain embodiments, additional lost circulation materials may include, but are not limited to, BARACARB® particulates (ground marble, available from Halliburton Energy Services, Inc.) including BARACARB® 5, BARACARB® 25, BARACARB® 150, BARACARB® 600, BARACARB® 1200; STEELSEAL® particulates (resilient graphitic carbon, available from Halliburton Energy Services, Inc.) including STEELSEAL® powder, STEELSEAL® 50, STEELSEAL® 150, STEELSEAL® 400 and STEELSEAL® 1000; WALL-NUT® particulates (ground walnut shells, available from Halliburton Energy Services, Inc.) including WALL-NUT® M, WALL-NUT® coarse, WALL-NUT® medium, and WALL-NUT® fine; BARAPLUG® (sized salt water, available from Halliburton Energy Services, Inc.) including BARAPLUG® 20, BARAPLUG® 50, and BARAPLUG® 3/300; BARAFLAKE® (calcium carbonate and polymers, available from Halliburton Energy Services, Inc.); and the like; and any combination thereof.

In certain embodiments, the treatment fluids and lost circulation materials of the present disclosure may be effective over a range of pH levels. For example, in certain embodiments, the treatment fluids may provide effective loss zone treatment from a pH of about 7 to about 12. Additionally, the treatment fluids of the present disclosure may be suitable for a variety of subterranean formations, including, but not limited to shale formations and carbonate formations.

In some embodiments, the treatment fluids of the present disclosure may have a density of from about 0.5 grams per cubic centimeter (g/cc) to about 4.0 g/cc, alternatively from about 0.8 g/cc to about 3 glee, alternatively from about 1.0 g/cc to about 2.5 g/cc. The density may be measured by any suitable methodology.

In some embodiments, the methods of the present disclose may include introducing at least a portion of the treatment fluid within a loss zone or other flowpath through which the flow of fluids may be desirably reduced or ceased. In some embodiments, the treatment fluid may be introduced to the wellbore to prevent the loss of aqueous or non-aqueous fluids into loss zones such as voids, vugular zones, perforations, and natural or induced fractures.

The compositions used in the methods of the present disclosure may include any aqueous base fluid known in the art. The term "base fluid" refers to the major component of the fluid (as opposed to components dissolved and/or suspended therein), and does not indicate any particular condition or property of that fluid such as its mass, amount, pH, etc. Aqueous fluids that may be suitable for use in the methods and compositions of the present disclosure may include water from any source. Such aqueous fluids may include fresh water, salt water (e.g., water containing one or more salts dissolved therein), brine (e.g., saturated salt water), seawater, or any combination thereof. The aqueous fluids may include one or more ionic species, such as those formed by salts dissolved in water. For example, seawater and/or produced water may include a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. In an embodiment, the amount of base fluid present in the treatment fluid may be from about 50 to about 95 percent by weight (wt. %) of the treatment fluid, alternatively, from about 70 wt. % to about 90 wt. %, alternatively, from about 70 wt. % to about 85 wt. %.

In certain embodiments, the methods and compositions of the present disclosure optionally may include any number of additional additives. Examples of such additional additives include, but are not limited to, salts, surfactants, acids, proppant particulates, diverting agents, gas, nitrogen, carbon dioxide, surface modifying agents, tackifying agents, foamers, corrosion inhibitors, scale inhibitors, catalysts, clay control agents, biocides, friction reducers, antifoam agents, flocculants, $H_2S$ scavengers, $CO_2$ scavengers, oxygen scavengers, lubricants, viscosifiers, breakers, relative permeability modifiers, resins, wetting agents, coating enhancement agents, filter cake removal agents, antifreeze agents (e.g., ethylene glycol), cross-linking agents, curing agents, gel time moderating agents, curing activators, and the like. In some embodiments, the treatment fluid may contain rheology (viscosity and gel strength) modifiers and stabilizers. A person skilled in the art, with the benefit of this disclosure, will recognize the types of additives that may be included in the fluids of the present disclosure for a particular application.

The methods and compositions of the present disclosure can be used in a variety of applications. These include downhole applications (e.g., drilling, fracturing, completions, oil production), use in conduits, containers, and/or other portions of refining applications, gas separation towers/applications, pipeline treatments, water disposal and/or treatments, and sewage disposal and/or treatments. In certain embodiments, a treatment fluid may be introduced into a subterranean formation. In some embodiments, the treatment fluid may be introduced into a wellbore that penetrates a subterranean formation. In certain embodiments, a wellbore may be drilled and the treatment fluid may be circulated in the wellbore during, before, or after the drilling. In some embodiments, the treatment fluid may be introduced at a pressure sufficient to create or enhance one or more fractures within the subterranean formation (e.g., hydraulic fracturing).

The methods and compositions of the present disclosure may directly or indirectly affect one or more components or pieces of equipment associated with the preparation, delivery, recapture, recycling, reuse, and/or disposal of the compositions of the present disclosure. For example, the methods and compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the compositions of the present disclosure. The methods and compositions of the present disclosure may also directly or indirectly affect any transport or delivery equipment used to convey the fluid to a well site or downhole such as, for example, any transport vessels, conduits, pipelines, trucks, tubulars, and/or pipes used to compositionally move fluids from one location to another, any pumps, compressors, or motors (e.g., topside or downhole) used to drive the fluids into motion, any valves or related joints used to regulate the pressure or flow rate of the fluids, and any sensors (i.e., pressure and temperature), gauges, and/or combinations thereof, and the like. For example, and with reference to FIG. 1, the lost circulation materials of the present disclosure may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates wellbore fluid 122 (e.g., a drilling fluid or a lost circulation pill described herein) through a feed pipe 124 and to the kelly 110, which conveys the wellbore fluid 122 downhole through the interior of the drill string 108 and through one or more orifices in the drill bit 114 (or optionally through a bypass or ports (not shown) along the drill string and above the drill bit 114). The wellbore fluid 122 is then circulated back to the surface via an annulus 126 defined between the drill string 108 and the walls of the wellbore 116. At the surface, the recirculated or spent wellbore fluid 122 exits the annulus 126 and may be conveyed to one or more fluid processing unit(s) 128 via an interconnecting flow line 130. After passing through the fluid processing unit(s) 128, a "cleaned" wellbore fluid 122 is deposited into a nearby retention pit 132 (e.g., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

One or more of the lost circulation materials of the present disclosure may be added to the wellbore fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the lost circulation materials of the present disclosure may be added to the wellbore fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the lost circulation materials of the present disclosure may be stored, reconditioned, and/or regulated until added to the wellbore fluid 122.

As mentioned above, the lost circulation materials of the present disclosure may directly or indirectly affect the components and equipment of the drilling assembly 100. For example, the lost circulation materials of the present disclosure may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and any fluid reclamation equipment. The fluid processing unit(s) 128 may further include one or more sensors, gauges, pumps, compressors, and the like used store, monitor, regulate, and/or recondition the exemplary lost circulation materials.

The lost circulation materials of the present disclosure may directly or indirectly affect the pump 120, which representatively includes any conduits, pipelines, trucks, tubulars, and/or pipes used to fluidically convey the lost circulation materials downhole, any pumps, compressors, or motors (e.g., topside or downhole) used to drive the lost circulation materials into motion, any valves or related joints used to regulate the pressure or flow rate of the lost circulation materials, and any sensors (i.e., pressure, temperature, flow rate, etc.), gauges, and/or combinations thereof, and the like. The lost circulation materials of the present disclosure may also directly or indirectly affect the mixing hopper 134 and the retention pit 132 and their assorted variations.

The lost circulation materials of the present disclosure may also directly or indirectly affect the various downhole equipment and tools that may come into contact with the lost circulation materials such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The lost circulation materials of the present disclosure may also directly or indirectly affect any downhole heat exchangers, valves and corresponding actuation devices, tool seals, packers and other wellbore isolation devices or components, and the like associated with the wellbore 116. The lost circulation materials of the present disclosure may also directly or indirectly affect the drill bit 114, which may include, but is not limited to roller cone bits, PDC bits, natural diamond bits, any hole openers, reamers, coring bits, etc.

The methods and compositions of the present disclosure may also directly or indirectly affect the various downhole equipment and tools that may come into contact with the fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. In some embodiments, the treatment fluid is introduced into a wellbore using one or more pumps.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLES

The following examples use a series of binding materials and compressed materials to form compressed lost circulation materials.

Example 1

In this example, calcium carbonate ($CaCO_3$) crystallization is used to lock a compressed material into a compressed state. Calcium carbonate crystals were formed by mixing a $CaCl_2$ solution and a $NaCO_3$ solution and adding the mixture to a compressed reticulated foam material. The compressed reticulated foam and the mixture were then placed in an oven at 100° F. until dry. The steps of adding the $CaCl_2$ and $NaCO_3$ solution and drying in an oven were repeated several times until sufficient $CaCO_3$ crystals formed on the reticulated foam to lock the compressed material in place. A similar result could have been achieved by adding one of the reactants in powder form to the material, adding a solution of the other reactant, and drying in an oven at 100° F. As an alternative to drying in an oven, carbon dioxide could be flowed through the material to precipitate $CaCO_3$.

Figure 2A:
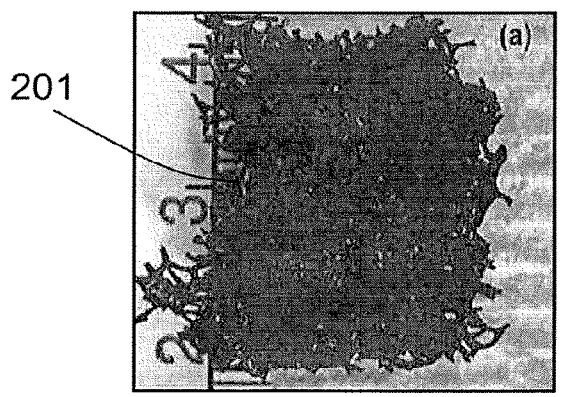
FIGS. 2A and 2B are photographs illustrating reticulated foam before and after combination with crystallized calcium carbonate in accordance with certain embodiments of the present disclosure.
Figure 2B:
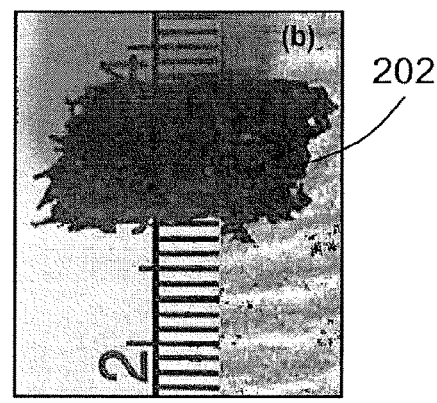

FIGS. 2A and 2B show a piece of reticulated foam before compression and consolidation with $CaCO_3$ 201 and after compression and consolidation with $CaCO_3$ 202. As shown, the material compresses by about 50% by volume and is retained in the compressed state by the $CaCO_3$ salt.

Example 2

Figure 3A:
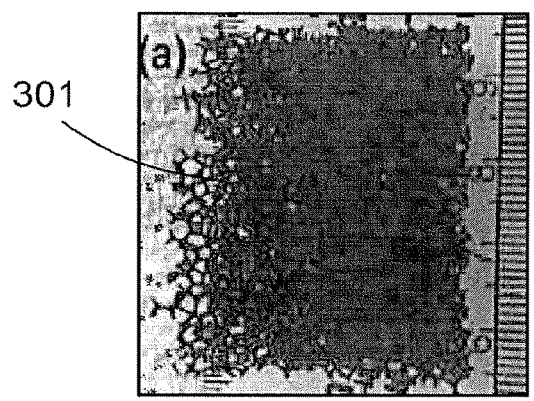
FIGS. 3A and 3B are photographs illustrating reticulated foam before and after combination with precipitated calcium chloride in accordance with certain embodiments of the present disclosure.
Figure 3B:
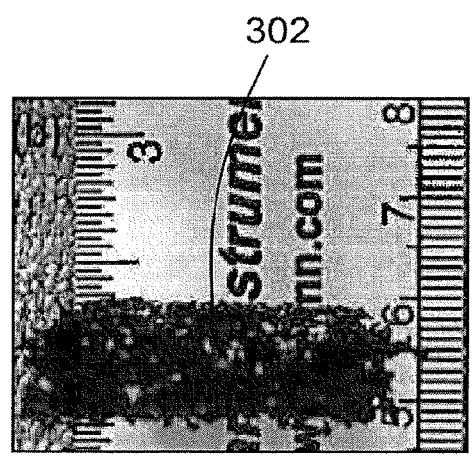

In this example, calcium chloride ($CaCl_2$) precipitation is used to lock a compressed material into a compressed state. Saturated $CaCl_2$ was added to compressed reticulated foam and the foam was dried in an oven at 100° F. FIGS. 3A and 3B show a piece of reticulated foam before compression and consolidation with $CaCl_2$ 301 and after compression and consolidation with $CaCl_2$) 302. As shown, the material compresses to about 25% of its original volume and is retained in the compressed state by the $CaCl_2$ salt.

Example 3

Figure 4A:
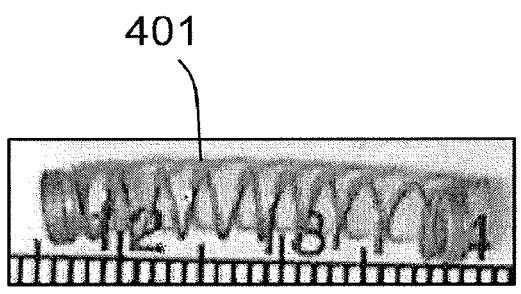
FIGS. 4A, 4B, 4C, and 4D are photographs illustrating a spring before and after compression and combination with an adhesive and after immersion in oil-based and water-based fluids in accordance with certain embodiments of the present disclosure.
Figure 4B:
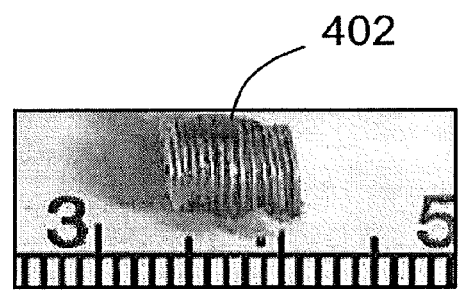
Figure 4C:
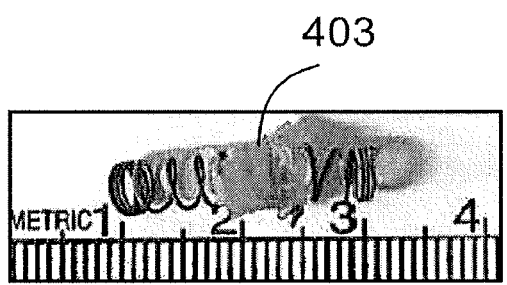
Figure 4D:
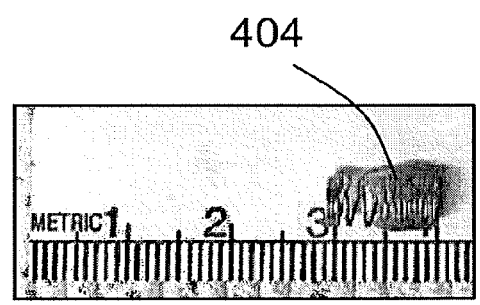

In this example, polyvinyl alcohol is used to lock a metal spring into a compressed state. A compressed metal spring was immersed in a 1% by weight aqueous solution of polyvinyl alcohol and allowed to dry. FIGS. 4A and 4B show the metal spring before compression and consolidation with polyvinyl alcohol 401 and after compression and consolidation with polyvinyl alcohol 402. As shown, the spring compresses to about 33% of its original length and is retained in the compressed state by the polyvinyl alcohol. FIG. 4C shows the full recovery of the spring to its original length after soaking the compressed spring 403 in deionized water for 16 hours at 200° F. FIG. 4D shows the partial recovery of the spring length 404 after soaking the compressed spring in diesel oil for 16 hours at 220° F.

An embodiment of the present disclosure is a method including: introducing a treatment fluid that includes a base fluid and a compressed lost circulation material into a wellbore penetrating at least a portion of a subterranean formation including a loss zone, the compressed lost circulation material including a binding material and a compressed material; allowing the binding material to at least partially degrade or dissolve; and allowing the compressed lost circulation material to at least partially expand in the subterranean formation.

In one or more embodiments described above, the at least partially expanded lost circulation material at least partially plugs the loss zone. In one or more embodiments described above, the binding material includes a salt, an adhesive, or any combination thereof. In one or more embodiments described above, the salt is selected from the group consisting of: a carbonate, a halide salt, and any combination thereof. In one or more embodiments described above, the adhesive is selected from the group consisting of: guar, hydroxypropyl guar, hydroxyethyl cellulose, carboxylmethylhydroxyethyl cellulose, xanthan gum, a polyacrylamide, a polyvinyl alcohol, a cyanoacrylate, a thermoplastic polyurethane, and any combination thereof. In one or more embodiments described above, the compressed material is selected from the group consisting of: a foam, a spring, an expandable polymer, a fiber, a silk, a wire screen, a glass, cotton, bamboo, jute, hemp, natural hair, a nut-husk material, carbon, nylon, polyethylene, polypropylene, an aramid, a ceramic, a rubber, cellulose, a cellulosic sponge, a polyester, rayon, bio-cellulose, and any combination thereof. In one or more embodiments described above, the compressed lost circulation material is present in the treatment fluid in an amount from about 1 to about 65% by weight of the treatment fluid. In one or more embodiments described above, the binding material is present in the compressed lost circulation material in an amount from about 1 to about 35% by weight of the treatment fluid. In one or more embodiments described above, the binding material at least partially degrades in response to a wellbore condition. In one or more embodiments described above, upon introduction into the wellbore, the compressed lost circulation material includes a plurality of particles having a multi-modal particle size distribution substantially uniform particle size distribution. In one or more embodiments described above, the at least partially expanded compressed lost circulation material includes a plurality of particles having a multi-modal particle size distribution. In one or more embodiments described above, the compressed lost circulation material includes particles sized within a range of from about 4 U.S. mesh to about 40 U.S. mesh. In one or more embodiments described above, the method further includes introducing a second treatment fluid into the wellbore; and allowing the second treatment fluid to contact the compressed lost circulation material in the wellbore, wherein the binding material at least partially degrades in response to contacting the second treatment fluid.

Another embodiment of the present disclosure is a composition including: a base fluid and a plurality of expandable compressed lost circulation material particles having a substantially uniform particle size distribution, wherein the plurality of expandable compressed lost circulation material particles have a multi-modal particle size distribution when at least partially expanded. In one or more embodiments described above, at least a portion of the plurality of expandable compressed lost circulation materials includes a binding material.

Another embodiment of the present disclosure is a method including: forming a compressed lost circulation material by combining a binding material with a compressed material; introducing a treatment fluid including a base fluid and the compressed lost circulation material into a wellbore penetrating at least a portion of a subterranean formation including a loss zone; and allowing the compressed lost circulation material to at least partially expand in the subterranean formation. In one or more embodiments described above, depositing the binding material onto the compressed material includes crystallizing or precipitating the binding material onto the compressed material. In one or more embodiments described above, the binding material is a thermally active degradable polymer. In one or more embodiments described above, the binding material is a water-soluble polymer. In one or more embodiments described above, the method further includes grinding the compressed lost circulation material into particles having a substantially uniform particle size distribution.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
forming a compressed lost circulation material by crystallizing or precipitating a binding material comprising a salt onto a compressed material, wherein the compressed material is selected from the group consisting of: a foam, a spring, a fiber, a silk, a wire screen, a glass, cotton, bamboo, jute, hemp, natural hair, a nut-husk material, carbon, nylon, polyethylene, polypropylene, an aramid, a ceramic, a rubber, cellulose, a cellulosic sponge, a polyester, rayon, bio-cellulose, and any combination thereof;
introducing a treatment fluid that comprises a base fluid and the compressed lost circulation material into a wellbore penetrating at least a portion of a subterranean formation comprising a loss zone, the compressed lost circulation material comprising a combination of the binding material and the compressed material;
allowing the binding material to at least partially degrade or dissolve; and
allowing the compressed lost circulation material to at least partially expand in the subterranean formation,
wherein, upon introduction into the wellbore, the compressed lost circulation material comprises a plurality of particulates, wherein the standard deviation of the particle sizes of the particulates is within 30% of the mean particle size.

2. The method of claim 1, wherein the at least partially expanded lost circulation material at least partially plugs the loss zone.

3. The method of claim 1, wherein the salt is selected from the group consisting of: a carbonate, a halide salt, and any combination thereof.

4. The method of claim 3 wherein the salt comprises calcium.

5. The method of claim 4 wherein the salt comprises calcium chloride or calcium carbonate.

6. The method of claim 5 wherein the compressed material comprises the foam, wherein the foam comprises a reticulated foam.

7. The method of claim 1, wherein the compressed lost circulation material is present in the treatment fluid in an amount from about 1% to about 65% by weight of the treatment fluid.

8. The method of claim 1, wherein the binding material is present in the compressed lost circulation material in an amount from about 1% to about 35% by weight of the treatment fluid.

9. The method of claim 1, wherein the binding material at least partially degrades in response to a wellbore condition.

10. The method of claim 1, wherein the at least partially expanded compressed lost circulation material comprises a plurality of particulates having a multi-modal particle size distribution.

11. The method of claim 1, wherein the compressed lost circulation material comprises particles sized within a range of from about 4 U.S. mesh to about 40 U.S. mesh.

12. The method of claim 1, further comprising:
introducing a second treatment fluid into the wellbore; and
allowing the second treatment fluid to contact the compressed lost circulation material in the wellbore, wherein the binding material at least partially degrades in response to contacting the second treatment fluid.

13. A method comprising:
forming a compressed lost circulation material by mixing one or more solutions comprising a binding material with a compressed material and drying the mixture, wherein the binding material comprises a salt and wherein the compressed material is selected from the group consisting of: a foam, a spring, a fiber, a silk, a wire screen, a glass, cotton, bamboo, jute, hemp, natural hair, a nut-husk material, carbon, nylon, polyethylene, polypropylene, an aramid, a ceramic, a rubber, cellulose, a cellulosic sponge, a polyester, rayon, bio-cellulose, and any combination thereof;
introducing a treatment fluid that comprises a base fluid and the compressed lost circulation material into a wellbore penetrating at least a portion of a subterranean formation comprising a loss zone, the compressed lost circulation material comprising a combination of the binding material and the compressed material;
allowing the binding material to at least partially degrade or dissolve; and
allowing the compressed lost circulation material to at least partially expand in the subterranean formation,
wherein, upon introduction into the wellbore, the compressed lost circulation material comprises a plurality of particulates, wherein the standard deviation of the particle sizes of the particulates is within 30% of the mean particle size.

14. The method of claim 13, wherein the at least partially expanded lost circulation material at least partially plugs the loss zone.

15. The method of claim 13, wherein the salt is selected from the group consisting of: a carbonate, a halide salt, and any combination thereof.

16. The method of claim 15 wherein the salt comprises calcium.

17. The method of claim 16 wherein the salt comprises calcium chloride or calcium carbonate.

18. The method of claim 17 wherein the compressed material comprises the foam, wherein the foam comprises a reticulated foam.

19. The method of claim 13, wherein the compressed lost circulation material is present in the treatment fluid in an amount from about 1% to about 65% by weight of the treatment fluid.

20. The method of claim 13, wherein the at least partially expanded compressed lost circulation material comprises a plurality of particulates having a multi-modal particle size distribution.

* * * * *